US005820007A

United States Patent [19]

Crowley

[11] Patent Number: 5,820,007

[45] Date of Patent: Oct. 13, 1998

[54] METHOD AND APPARATUS FOR PINLESS FEEDING OF WEB TO A UTILIZATION DEVICE

[75] Inventor: H. W. Crowley, Newton, Mass.

[73] Assignee: Roll Systems, Inc., Burlington, Mass.

[21] Appl. No.: 814,916

[22] Filed: Mar. 12, 1997

Related U.S. Application Data

[63] Continuation of Ser. No. 334,730, Nov. 4, 1994, abandoned.

[51] Int. Cl.[6] .............................. B65H 23/18; G03B 1/30

[52] U.S. Cl. .............................. 226/31; 226/74; 226/88

[58] Field of Search .............................. 226/2, 16, 21, 226/30, 74, 87, 28, 31, 88

[56] References Cited

U.S. PATENT DOCUMENTS

| | | | |
|---|---|---|---|
| 2,996,951 | 8/1961 | Debrie . | |
| 3,209,973 | 10/1965 | Eichorn | 226/74 |
| 3,466,716 | 9/1969 | Hancock et al. . | |
| 3,558,109 | 1/1971 | Sofue . | |
| 3,588,346 | 6/1971 | Ramig, Jr. . | |
| 3,713,571 | 1/1973 | Simonton | 226/2 |
| 3,858,777 | 1/1975 | Rodek | 226/30 |
| 3,874,621 | 4/1975 | Blair et al. . | |
| 3,921,878 | 11/1975 | Zangenfeind . | |
| 4,136,808 | 1/1979 | Reba . | |
| 4,361,260 | 11/1982 | Hanlan | 226/30 |
| 4,363,270 | 12/1982 | Ury et al. . | |
| 4,461,468 | 7/1984 | Peter et al. . | |
| 4,552,608 | 11/1985 | Hoffmann et al. | 226/30 X |
| 4,625,902 | 12/1986 | Billberg . | |
| 4,655,626 | 4/1987 | Okazaki . | |
| 4,693,620 | 9/1987 | Harumatsu | 226/74 X |
| 4,790,466 | 12/1988 | Ueno et al. . | |
| 4,839,674 | 6/1989 | Hanagata et al. . | |
| 4,890,140 | 12/1989 | Negoro et al. | 226/74 X |
| 4,945,252 | 7/1990 | Lerner et al. . | |
| 4,994,975 | 2/1991 | Minschart . | |
| 5,012,291 | 4/1991 | Buchan et al. . | |
| 5,037,016 | 8/1991 | Wingerter . | |
| 5,043,904 | 8/1991 | Sikes et al. . | |
| 5,063,416 | 11/1991 | Honda et al. | 226/28 X |
| 5,072,359 | 12/1991 | Kneifel, II | 226/21 X |
| 5,098,507 | 3/1992 | Mao . | |
| 5,103,263 | 4/1992 | Moore et al. . | |
| 5,123,887 | 6/1992 | Shimura . | |
| 5,138,341 | 8/1992 | Kobayashi | 226/16 X |
| 5,193,727 | 3/1993 | Crowley . | |
| 5,213,246 | 5/1993 | Crowley . | |
| 5,344,057 | 9/1994 | Crowley . | |
| 5,345,863 | 9/1994 | Kurata et al. . | |

FOREIGN PATENT DOCUMENTS

| | | | |
|---|---|---|---|
| 884192 | 8/1943 | France . | |
| 3604915A1 | 2/1986 | Germany . | |

OTHER PUBLICATIONS

IBM 3900 Advanced Function Printer Maintenance Library vol. 1, SA37–0200–02, International Business Machines Corporation, 3rd Edition, Oct., 1992.

*Primary Examiner*—Michael Mansen
*Assistant Examiner*—William A. Rivera
*Attorney, Agent, or Firm*—Cesari and McKenna, LLP

[57] ABSTRACT

A system for utilizing web that is free of tractor pin feed holes comprises the driving of the web along a predetermined path within the utilization device. A web guide is provided in an upstream location from a utilization device element. The guide engages width-wise edges of the web and forms the web into a trough to stiffen the web. A drive roller and a follower roller impinge upon opposing sides of the web and rotate to drive the web through the guide. The drive roller is located adjacent to the guide according to a preferred embodiment. A registration controller is utilized to synchronize the movement of the web with the operation of the utilization device element. The controller includes a drive controller that controls the speed of either the drive roller or the utilization device element to maintain the web and the utilization device element in appropriate synchronization.

12 Claims, 9 Drawing Sheets

METHOD AND APPARATUS FOR PINLESS FEEDING OF WEB TO A UTILIZATION DEVICE

This application is a continuation of application Ser. No. 08/334,730, filed Nov. 4, 1994, now abandoned.

FIELD OF THE INVENTION

The present invention relates generally to a method and apparatus for transferring tractor pin feed hole-free web to and from a utilization device normally adapted to drive web using a tractor pin feed arrangement.

BACKGROUND OF THE INVENTION

In high volume printing applications, laser printers such as the IBM® 3800™ and 3900™ series, as well as the Siemens® 2140™, 2200™, and 2240™ series, lay down images on a continuous web by directing the web through an image element, that, typically, comprises a moving image drum having toner deposited thereon. A portion of such a web 12 is illustrated in FIG. 1. The feeding of the web 12 to the image drum is facilitated by one or more "tractor pin" feed units that engage evenly spaced holes 14 disposed along opposing widthwise edges of the web on "pin feed" strips 16. The widthwise edges having "tractor pin feed holes" therein, as well as the sheets themselves often include perforations 17, 18, respectively, for easy removal.

A typical pin feed application is depicted in FIG. 2. A source 20 of continuous web 22 is driven (arrow 24) to an image transfer element 26 of a printer 28. Toner 30 is provided to the image transfer element or drum 26 by operation of the optical print head 32. A separate developer 34 is provided to attract the toner to the drum 26. The web 22 engages the image drum 26 at a transfer station 36 where printing is laid upon the web as it passes over the image drum 26. The image drum rotates (arrow 38) at a speed matched to the speed of web travel. The web 22 is driven to and from the image drum 26 by a pair of tractor units 40 and 42 that each include a plurality of pins 44 on moving endless tractor beds 45 for engaging pin holes in the edges of the web. The pin holes 14 are detailed in FIG. 1 discussed above.

Downstream of the tractor feed units 40 and 42, the web 22 is directed over a fuser 46 and a preheat unit 48 that fixes the toner to the web 22. The web is subsequently directed to a puller unit 50 that comprises a pair of pinch rollers and into a director chute 52 onto a stack of zigzag folded finished web 54.

A significant disadvantage of a printer arrangement according to FIG. 2 is that the additional inch to inch and one half of web that must be utilized to provide the tractor feed hole strips entails significant waste. The web area between the tractor feed pin hole strips already comprises a full size page and, thus, the tractor feed strips represent area having no useful function other than to facilitate driving of the web into the printer. In a typical implementation, the pin holes are subsequently torn or cut off and disposed of following the printing process.

A variety of utilization devices currently employ tractor pin feed continuous web. Such a feed arrangement is a standard feature on most devices that utilize more than 80 pages per minutes. Specialized equipment has been developed to automatically remove tractor pin feed strips when they are no longer needed. Hence, substantial cost and time is devoted to a web element that does not contribute to the finished appearance of the completed printing job. However, such tractor pin feed strips have been considered, until now, a "necessary evil" since they ensure accurate feeding and registration of web through a utilization device.

It is, therefore, an object of this invention to provide a reliable system for feeding continuous web through a utilization device that does not entail the use of wasteful edgewise strips having tractor pin feed holes.

It is another object of this invention to provide a system and method for feeding web that ensures accurate registration of the web with other moving elements of a utilization device and enables web to be directed to a variety of locations.

SUMMARY OF THE INVENTION

This invention relates to a system and method for utilizing web that is free of tractor pin feed holes. The system and method comprise the driving of the web along a predetermined path within the utilization device. A web guide is provided in an upstream location from a utilization device element. The guide engages width-wise edges of the web and forms the web into a trough to stiffen the web. A drive roller and a follower roller impinge upon opposing sides of the web and rotate to drive the web through the guide. The drive roller is located adjacent to the guide according to a preferred embodiment. A registration controller is utilized to synchronize the movement of the web with the operation of the utilization device element. The controller includes a drive controller that controls the speed of either the drive roller or the utilization device element to maintain the web and the utilization device element in appropriate synchronization.

In a preferred embodiment, the web guide can comprise tractor pin feed drive assemblies in which the tractor pins include plates that overlie the tractor pins. In such an embodiment, web is held in place along its width-wise edges by the overlying plates and is retained against side-to-side movement by the tractor pins. The tractor pins engage the outer edges of the web (rather than holes formed in the edges of the web) and form the web into a trough that provides substantial beam strength to the web and enables accurate guiding of the web through the utilization device element. The drive roller can be located offset from a plane formed by the tractor pin belts to facilitate the formation of the trough.

The drive roller can be interconnected with the tractor pin feed drive element and operate in synchronization therewith. The follower roller of the drive roller can be provided with a pivotal bracket that allows the follower roller to be moved into and out of engagement with the drive roller so that web can be easily loaded onto the utilization device.

The utilization device element can comprise a rotating image drum according to a preferred embodiment and the utilization device can comprise a printer or copier adapted to feed continuous web. The registration controller, similarly, can comprise a sensor that senses a selected mark on the web such as a preprinted mark or a perforation. The controller can be adapted to scan for a mark at a selected time interval and modify the speed of the drive roller based upon the presence or absence of such a mark.

According to a preferred embodiment, the drive motor can include an advance and retard mechanism that is responsive to the controller to maintain the driven web in synchronization with the utilization device element. A registration drive motor and a differential gearing system can be provided to enable advancing and retarding of the drive roller.

While the term "drive roller" is utilized according to this embodiment, it is contemplated that a variety of different driving mechanisms that enable advancing of a web to a utilization device element can be utilized according to this invention. It is of primary significance that such devices be capable at advancing a web that is free of tractor pin feed holes along the edges thereof or otherwise thereon. For example, a drive belt or belts can be substituted for the drive roller and the word "roller" is particularly contemplated to include such a belt or belts. Similarly, the drive can comprise a full-width roller or reciprocating foot or shoe that advances the web in selected increments.

BRIEF DESCRIPTION OF THE DRAWINGS

The foregoing and other objects and advantages of the invention will become more clear with reference to the following detailed description of the preferred embodiments as illustrated by the drawings in which.

DETAILED DESCRIPTION OF THE PREFERRED EMBODIMENT

Figure 3:
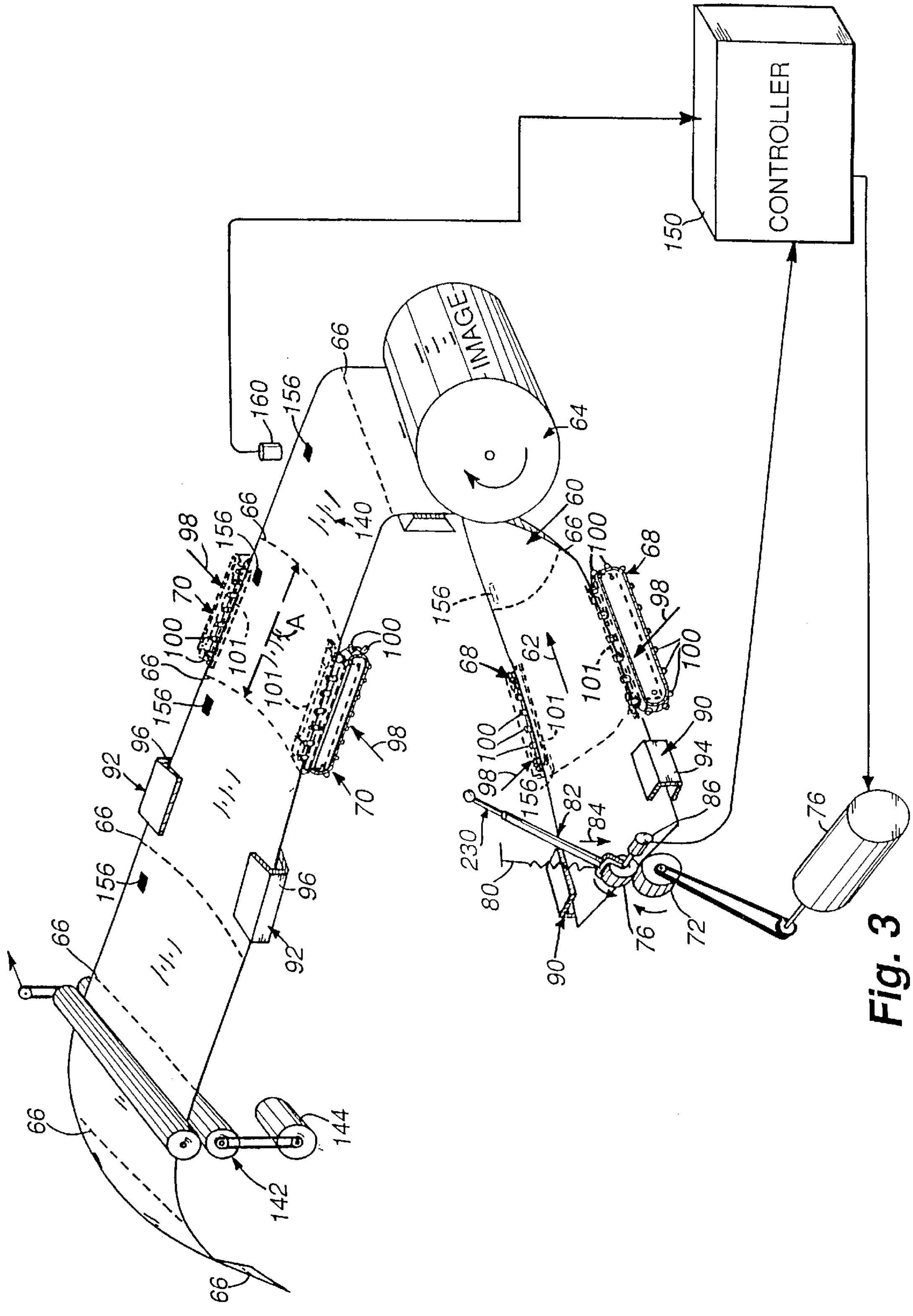
FIG. 3 is a schematic perspective view of a pinless web feed system according to a preferred embodiment.

A system for feeding web to a utilization device image drum, without use of tractor pin feed holes, is depicted in FIG. 3. A web 60 is shown moving in a downstream direction (arrow 62) to an image transfer drum 64 of conventional design. The web 60 according to this embodiment can include perforations 66 that define standard size sheets therebetween. A distance A separates the perforations 66. For the purposes of this discussion, A shall be taken as a standard page length of 11 inches, but any suitable dimension for both length and width of sheets is expressly contemplated. Note that perforations are optional and that an unperforated plain paper web is also expressly contemplated according to this invention. Printed sheets can be subsequently separated from such a continuous web by a cutter (not shown).

As noted above, virtually all high speed printers and web utilization devices have heretofore required the use of tractor pin feed systems to insure accurate feeding of continuous web through the utilization device. Since pin holes are provided at accurate predetermined locations along the edges of a prior art continuous web, the web is consistently maintained in registration with the moving elements of the utilization device. This is particularly desirable when a moving image drum is utilized, since any error in registration has a cumulative effect and causes substantial misalignment of the printed text upon the web. The misalignment may, over time, cause the text to overlap onto an adjoining sheet.

Accordingly, to provide an effective feeding system for utilization devices, a suitable replacement for each of the driving, guiding and registration functions normally accomplished by the tractor pin feed system is desirable. The embodiment of FIG. 3 represents a system that contemplates alternatives to each of the functions originally performed by the tractor pin feed system.

As detailed in FIG. 3, the web 60 lacks tractor pin feed strips. While not required, according to this embodiment the tractor pin feed drive elements 68 and 70 have been retained. Actual driving is, however, accomplished by a drive roller 72 located at the upstream ends of the image drum 64. The drive roller 72, according to this embodiment, is propelled by a belt-linked drive motor 77. The motor 77 can comprise a suitable electric drive motor having speed control capabilities. Alternatively, the motor (not shown) utilized for operating the tractor pin feed drive elements 68 and 70 can be employed, via appropriate gearing, to drive the drive roller 72.

The drive roller 72 can comprise a polished metallic roller that bears against a side of the web 60. The drive roller 72 can have a width of approximately one inch or more and should generate sufficient friction against the web 60 to ensure relatively slip-free drive of the web 60. Wider labels, a narrower roller or a plurality of rollers are also contemplated.

In order to enhance the frictional engagement of the wheel 72 with the web 60, a follower roller 76 is provided. The follower roller 76 bears upon an opposing side of the web 60 to form a pinch roller pair. The follower roller, according to this embodiment, includes a spring 80 that pressurably maintains (arrow 84) the follower roller 76 against the web 60 and drive roller 72 via a pivotal mounting bracket 82. The pressure should be sufficient to ensure that an appropriate driving friction is generated by the drive roller 72 against the web. The follower roller 76 can include an elastomeric wheel surface for slip-free movement relative to the web 60. Since the follower roller 76 rotates relative to the web in relatively slip-free engagement, the roller 76, according to this embodiment is interconnected with an encoder 86 or other sensor that generates appropriate electronic signals in response to a predetermined arcuate movement. Such arcuate movement can be translated into a relatively precise indication of the length of web passing through a corresponding drive element. The follower roller 76, thus, can be utilized as a registration mechanism. The encoder functions and the operation of this registration mechanism is described further below.

Since the tractor pin feed drives 68 and 70 are typically located substantially adjacent a given utilization device element (such as the drum 64), the tractor pin feed drives 68 and 70 normally provide sufficient guiding to ensure that the web is accurately aligned with the utilization device element (drum 64) in a conventional pin feed configuration. Such guiding results, in part, from the forced alignment of the web at its widthwise edges. Alignment is facilitated by the synchronous movement of pins at each side of the web and the fact that the pin feed drive members are typically elongated so that several pins engage each edge simultaneously. However, absent such forced alignment (in, for example, a pinless feed configuration), the natural flexibility of a web would tend to cause skewing and buckling at the utilization device element (image drum 64 in this embodiment).

In some circumstances, it may be possible to locate the drive roller 72 immediately adjacent the utilization device element (64) to reduce the risk of buckling in a pinless drive. However, this may prove impractical or impossible in many utilization devices due to space limitations or, alternatively, may prove difficult if such drives are retrofitted to an existing utilization device. Accordingly, an alternative approach for guiding the web adjacent each of the drive elements 72 and 76 is provided according to this invention. Applicant's U.S. Pat. No. 4,909,426 (the teaching of which is expressly incorporated herein by reference) discloses a method and apparatus for guiding web that utilizes the natural beam strength of paper or other web material when formed into a trough with restrained side edges. In other words, by drawing the side edges of an elongated web toward each other so that the distance between the edges is less than the unbent width of the web, causes the web to form a trough that becomes rigid and resists buckling and lateral (side to side) movement. As such, the web can be driven effectively with accurate alignment downstream of the drive element.

Edge guiding according to this embodiment is provided by pairs of guide channels 90 and 92 located upstream and downstream of the image drum 64. The pairs of channels 90 and 84 are located so that end walls 94 and 96 are spaced from each other a distance that is less than the width of the unbent web. Accordingly, the web assumes a trough shape as depicted generally by the perforation lines 66. As noted above, the trough shape generates a beam-like characteristic in the web that maintains the edges in rigid alignment for introduction to the image drum 64. The channels 90 and 92 can be replaced with other structures having end walls such as a full trough.

The channels 90 or other guide structures are typically located adjacent the drive and follower rollers 72 and 76 to ensure the web remains aligned as it is driven. The guide structure can extend downstream to a location substantially adjacent the image drum. It is desirable that the web 60 be maintained relatively flat as it passes into the image drum 64 (or other utilization device element) so that the drum 64 can fully engage the web. If a full trough guide structure is utilized adjacent the drive and follower rollers 72 and 76 it is contemplated that an orifice (not shown) can be provided to enable the web to be engaged by the drive and follower rollers 72 and 76.

Even though the existing tractor pin feed drive elements 68 and 70 are not utilized according to this embodiment to effect drive of the web, these pin feeds drives can themselves accomplish the edge guide function. Most printer units such as the IBM® 3900™ series (statistics for which are available in IBM® 3900™ Advanced Function Printer Maintenance Library, Vol 5 1–4, Third Edition (October 1992), SA37-0200-02) and the Siemens® 2200™ and 2240™ systems utilize pin feed drive elements that are movable toward and away each other (arrows 98) to ensure proper engagement of tractor pin feed drive elements with a given width of web. For example, the user may wish to switch from standard 8½"×11" sheets to A4 standard sheets. According to this embodiment, each individual tractor pin feed drive element can be moved toward the other (arrows 98) until the pins 100 bear against the edges of the web. The pins can be moved so that their spacing from each other forms the desired trough shape in the web 60 (e.g., the distance of the wide edges of the opposing sets of pins from one another is less than the free width of the web. Since most tractor pin feed drive elements also include an overlying guide plates 101 (shown in phantom) the edges of the web 60 are restrained against upward movement when the web is formed into the trough shape.

Figure 4:
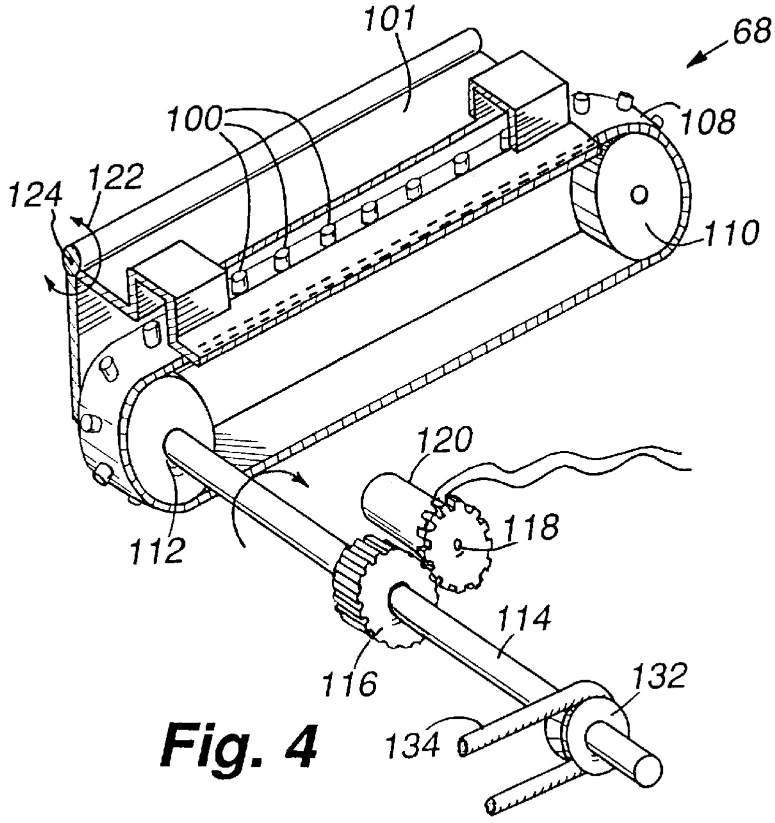
FIG. 4 is a somewhat schematic perspective view of a tractor pin feed element and drive mechanism according to this invention.

As further illustrated in FIG. 4, the exemplary tractor pin feed drive element 68 comprises an endless tractor belt 108 having the pins 100 projecting therefrom. The belt 108 is disposed between a pair of rollers 110 and 112. At least one of the rollers 112 is driven by a drive shaft 114 that can comprise a hexagonal cross-section drive shaft. A gear 116 is attached to the shaft 114 and engages a drive gear 118 that is interconnected with a drive motor 120. The drive motor can comprise a central drive motor that powers both tractor pin feed elements 68 and 70 according to this embodiment. In addition, as described further below, the drive motor arrangement can include an encoder that measures web of movement through the tractor pin feed drive elements.

As noted above, each tractor pin feed drive element 68 and 70 includes an overlying guide plate 101 that pivots (curved arrow 122) on an axis 124. This enables the guide plate 101 to be positioned adjacent and remote from the tractor pin feed belt 108 for loading and unloading of web.

Figure 5:
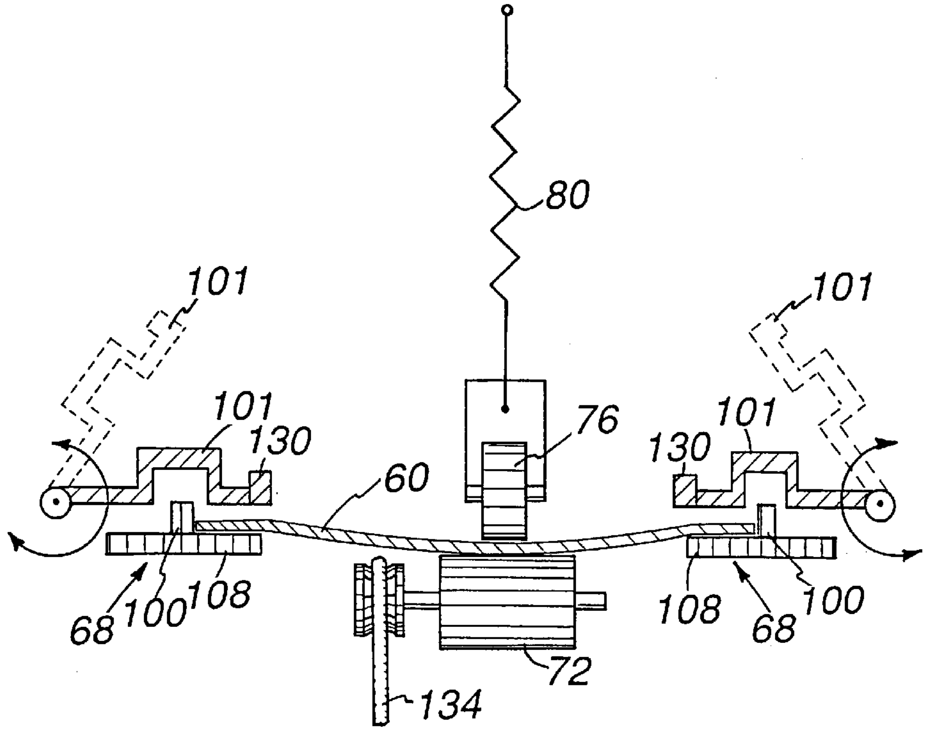
FIG. 5 is a somewhat schematic cross-section of a web positioned between the tractor pin feed elements according to this embodiment.

As further detailed in FIG. 5, each side of the tractor pin feed drive element 68, according to this embodiment, can be moved toward the other so that the web 60 forms a slight trough. Only a relatively small deflection in the web is necessary to ensure adequate beam strength. In this embodiment, the drive roller 72 is positioned approximately 0.025–0.030 inch below the plane formed by the tractor pin feed belts 108 to facilitate creation of the trough shape in the web 60.

It can be desirable in certain printer units such as the IBM® 3900τ series to extend the inwardly-directed length of the guide plates 101 to ensure proper edge restraint of the web 60. Thus, additional edge guides 130 are attached to each guide plate 101. These edge guides extend substantially the complete length of the guide plate in an upstream-to-downstream direction and have an inwardly directed width of approximately ¼ inch.

The blocks 130 are typically recessed approximately 0.020 inch above the lower face of the plates 101. Additionally, the blocks may include upwardly curving upstream edges. This configuration insures that the leading edge of a web will pass under the plates 101 during initial loading of the utilization device.

With further reference to FIG. 4, a pulley 132 can be provided to the drive shaft 114. The pulley 132 drives a belt 134 that can be interconnected with the drive roller 72 (FIG. 5) to facilitate driving of the drive roller 72 utilizing the existing tractor pin feed drive motor arrangement. Appropriate brackets can be provided to mount the drive roller 72 with respect to the underside of the web 60 as shown in FIG. 5.

Since the tractor pins 100 move on their respective belts 108 at a speed that substantially matches that of web travel through image drum 64 (via drive rollers 72, 76), the tractor pin feed drive elements 68 and 70 follow web movement and, thus, provide a relatively low-friction guiding mechanism. It is contemplated that most drive energy is still provided by the additional drive and follower rollers 72 and 76. As noted above, these drive elements 72 and 76 can be interconnected with the drive train of tractor pin feed units in some embodiments. Additionally, the use of tractor pin drives as guiding elements presumes that such elements are preexisting and that the pinless drive mechanism is a retrofitted installation to a utilization device.

Drive of the web 60 according to the prior art involves the use of two pairs of tractor pin feed drive assemblies 68 and 70 as depicted. However, the downstream tractor pin feed drive element 70 cannot easily be replaced with a drive member such as upstream drive roller 72. The text 140 transferred from the image transfer drum 64 is not yet fused to the web 60. Thus, applying a centralized drive roller to the web could potentially smudge or damage the image on the web. Additionally, it is desirable to enable printing across the entire width of a sheet, thus, edge rollers can be undesirable. While in some utilization device, a downstream drive roller can be provided without damaging the web, it is contemplated that downstream draw of the web according to this embodiment is regulated primarily by the fuser rollers 142 that simultaneously draw the web 60 and apply heat to fuse the image to the web 60. The downstream tractor feed drive element 70 is retained primarily for edge guiding of the web.

Figure 1:
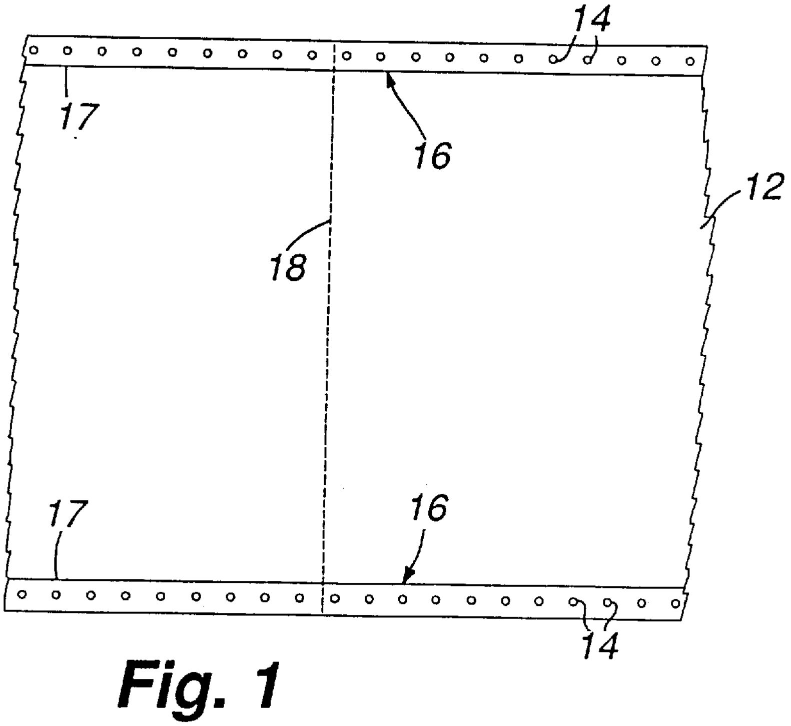
Fig. 1 (PRIOR ART)
FIG. 1 is a somewhat schematic plan view of a portion of a continuous web having pin feed strips according to the prior art.
Figure 2:
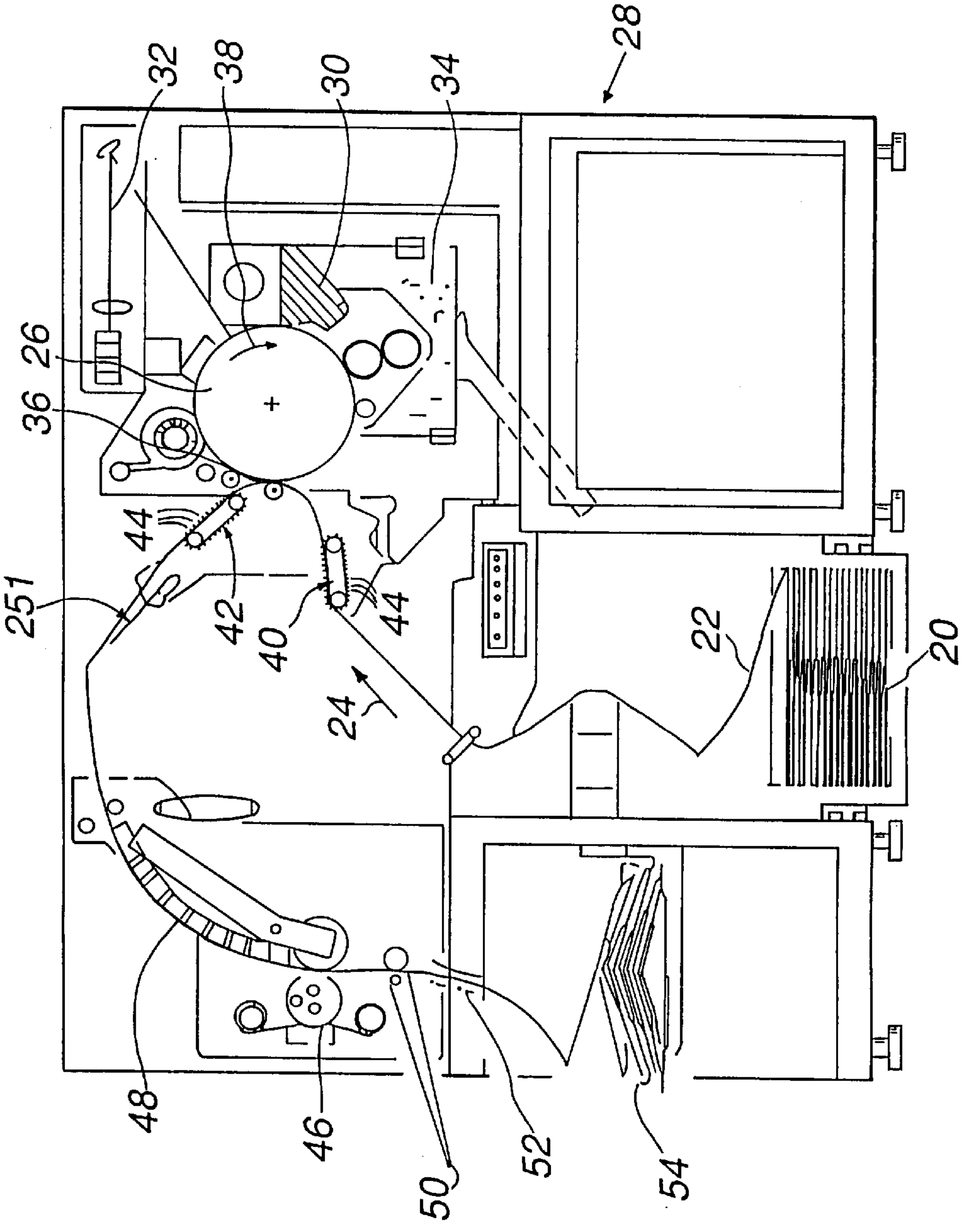
Fig. 2 (PRIOR ART)
FIG. 2 is a somewhat schematic side view of a printer that utilizes continuous web having tractor pin feed drive members according to the prior art.

In the majority of utilization devices such as the IBM® 3900™ series printer, the speed of the fuser rollers is governed relative to the speed of the image transfer drum 64. In many units, a dancer roll pivotally engages the web at a point of free travel where slack can form. The pivot of the dancer 251 shown for example in FIG. 2 is located adjacent the downstream tractor pin feed drive assembly 70. The dancer roll includes a speed control that is interconnected with the drive motor 144 of the fuser rollers 142. According to this embodiment, speed control of the fuser roller 142 is typically effected by a dancer roll or by sensing of a predetermined mark on the web. The use of such marks is described further below. Many utilization devices track the passage of the pin holes to govern speed. However, the absence of pin holes according to this embodiment necessitates of an alternate form of sensor.

Having provided an effective mechanism for both driving and guiding the web without use of tractor pin feed holes, there remains the provision of appropriate registration of the web 60 as it passes through the utilization device element. In a prior art tractor pin feed embodiment, as noted above, registration is provided naturally by the regular spacing of tractor pin feed holes along the web and the synchronization of the pin feed drive elements with the utilization device element. Absent the existence of pin holes on the web, some degree of slippage and variation in sheet length naturally causes misregistration of the web relative to the utilization device element over time. Hence, while a web may initially enter an image transfer element in perfect registration, the downstream end of the web could be offset by a half page or more causing text to be printed across a page break by completion of a large job.

Thus, registration of web relative to the utilization device element, according to this embodiment, involves the use of a mechanism that continuously determines the location of the web relative to the utilization device element (image transfer drum 64). As discussed above, the existing tractor feed drive (FIG. 4) or, alternatively, the follower roller 76 includes an encoder that generates pulses based upon passage of web 60 through the image transfer drum 64. 60 pulses per inch is a commonly-web standard. FIG. 3 illustrates a controller 150 that receives pulses from the encoder 86 on the follower roller 76 (or pinfeed drive element 68, 70 drive train).

Figure 6:
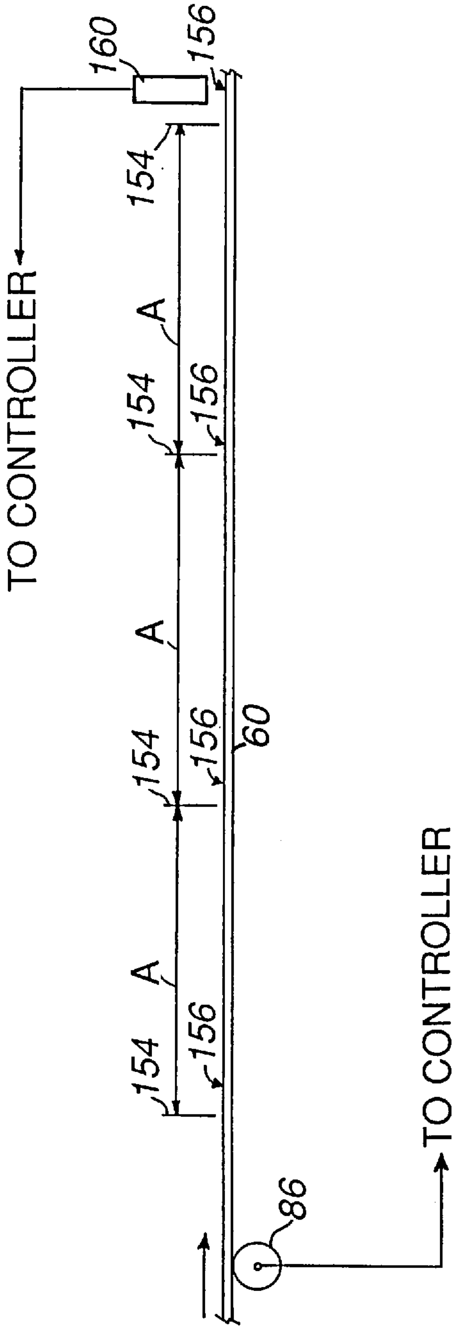
FIG. 6 is a schematic side view of a web registration system according to the preferred embodiment.

With further reference to FIG. 6, the pulses generated by the encoder 86 can be calibrated by the controller 150 to track the passage of the length A of web 60 thereover. As long as the web 60 remains synchronized with the image drum 64, a given length A of web bounded by page breaks 154 should pass over the image drum in synchronization with the image delivered thereon. If, however, the length passing over the image drum is greater than or less than A, the web 60 will slowly become offset relative to the printed image. Such offset can be cumulative and radially skew the printing on the web.

As noted, prior art printers avoided much of the problem associated with cumulative offset by using the regularly spaced tractor pin feed holes as a guide that insures alignment of the web with the image drum. However, the pinless drive roller 72 may cause minor web slippage. Thus, to insure the registration of the web 60 relative to the image drum 64 is maintained, regularly spaced print marks 156 (FIG. 3) are provided at predetermined intervals along the web. These regularly spaced marks 156 can comprise visible or invisible marks. It is necessary only that the marks be sensed by some accepted sensing mechanism. For example, infrared or UV sensitive marks can be utilized. Similarly, notches or perforations can be utilized as marks. The marks can be spaced relative to each page break or at selected multiples of page breaks, so long as the marks are spaced in a predictable pattern that indicates a relative location on the web.

A sensor 160, which in this embodiment is an optical sensor, is interconnected with the controller 150 and is programmed to sense for the presence of the preprinted mark 156 at a time that correlates to the passage of page length A through the image transfer drum 64. If the mark 156 is sensed, the current drive roller speed is maintained. However, if the mark is no longer sensed, the speed is increased or decreased until the mark 156 is again sensed for each passage of a page length A of web 60 through the image drum 64.

In operation, the controller 150 continuously receives encoder pulses from the encoder 86. When a number of pulses are received that correlates to a page length A the controller queries the sensor 160 for the presence or absence of a mark 156. Absence of mark, triggers an incremental increase or decrease in drive roller speed until the mark 156 again appears at the appropriate time. In order to ensure that any increase or decrease in speed is appropriately made as required, the sensor 160 can be programmed to strobe at, for example, 60 cycles per second to determine the almost exact time of passage of a mark relative to the timing of the passage of a length A of web through the image drum 64. Hence, if the strobed sensor senses that the mark 156 has passed before the passage of a length of web, the drive roller 72 can be instructed to speed up. Conversely, if the mark 156 is sensed subsequent to the passage of a length of web through the image drum 64, then the drive roller 72 can be instructed to slow. Since feed using a drive roller 72 according to this embodiment is relatively reliable and slip-free, the speed-up and slow-down functions can occur in relatively small increments (such as a few hundredths or thousandths of an inch per second). An effective method for tracking web is disclosed in Applicant's U.S. Pat. Nos. 4,273,045, 4,736,680 and 5,193,727, the disclosures of which are expressly incorporated herein by reference. With reference to U.S. Pat. No. 5,193,727, a method and apparatus for tracking web utilizing marks on the web is contemplated. These marks enable the determination of page breaks despite the existence of slack in the web.

Figure 7:
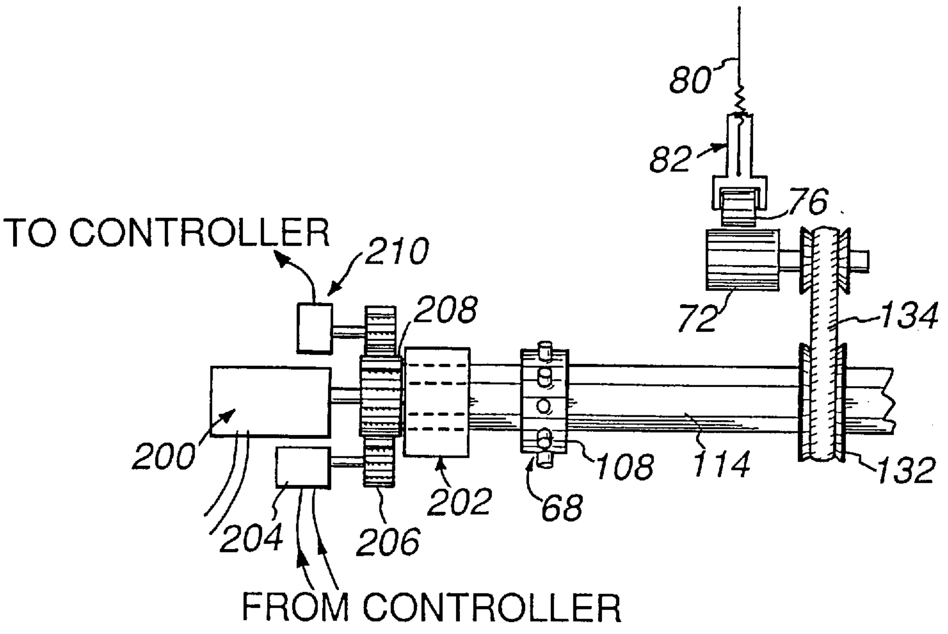
FIG. 7 is a somewhat schematic side view of a registration mechanism according to an embodiment of this invention.

As discussed above, the drive roller 72 can be interconnected with the tractor pin feed drive shaft 114 via a pulley 132 and belt 134 interconnection. FIG. 7 illustrates a registration controller that interacts with the drive shaft 114. Thus, the existing tractor pin feed drive motor and mechanism can be utilized according to this embodiment. The drive feed motor 200 is interconnected with the drive shaft 114 via a differential unit 202 that, according to this embodiment, can comprise a Harmonic Drive differential that enables concentric application of main drive force and differential rotation. Harmonic Drive gearing utilizes inner and outer gear teeth that differ in number. The inner oscillates relative to the outer to provide a slow advance or retard function. Such gearing typically offers ratios of 50:1 to 320:1. Thus, for a given rotation applied by the main motor 200, a relatively small rotational correction can be applied by the differential motor 204. Other forms of differentials are also contemplated. In the illustrated embodiment, the differential drive motor 204 is interconnected by gearing 206 and 208 that is interconnected with the differential 202. The differential motor drive 204, according to this embodiment, receives drive signals from the controller that enable forward and reverse drive of the differential drive motor 204. The differential 202 responds to such forward and reverse drive signals by advancing or retarding the drive shaft relative to the main drive motor 200. Hence, small incremental changes in web location relative to the movement of the image transfer drum can be effected using the differential 202 according to this embodiment.

As previously discussed, signals instructing advance and retard of the main drive roller can be provided based upon the location of predetermined marks on the web relative to the passage of a given length of web through the image transfer drum. Thus, an encoder 210 is interconnected with main drive motor 200 via gear 208. The encoder 210 can comprise the original encoder used with the printer drive mechanism. Similarly, an internal encoder can be provided in the main drive motor 200.

Figure 8:
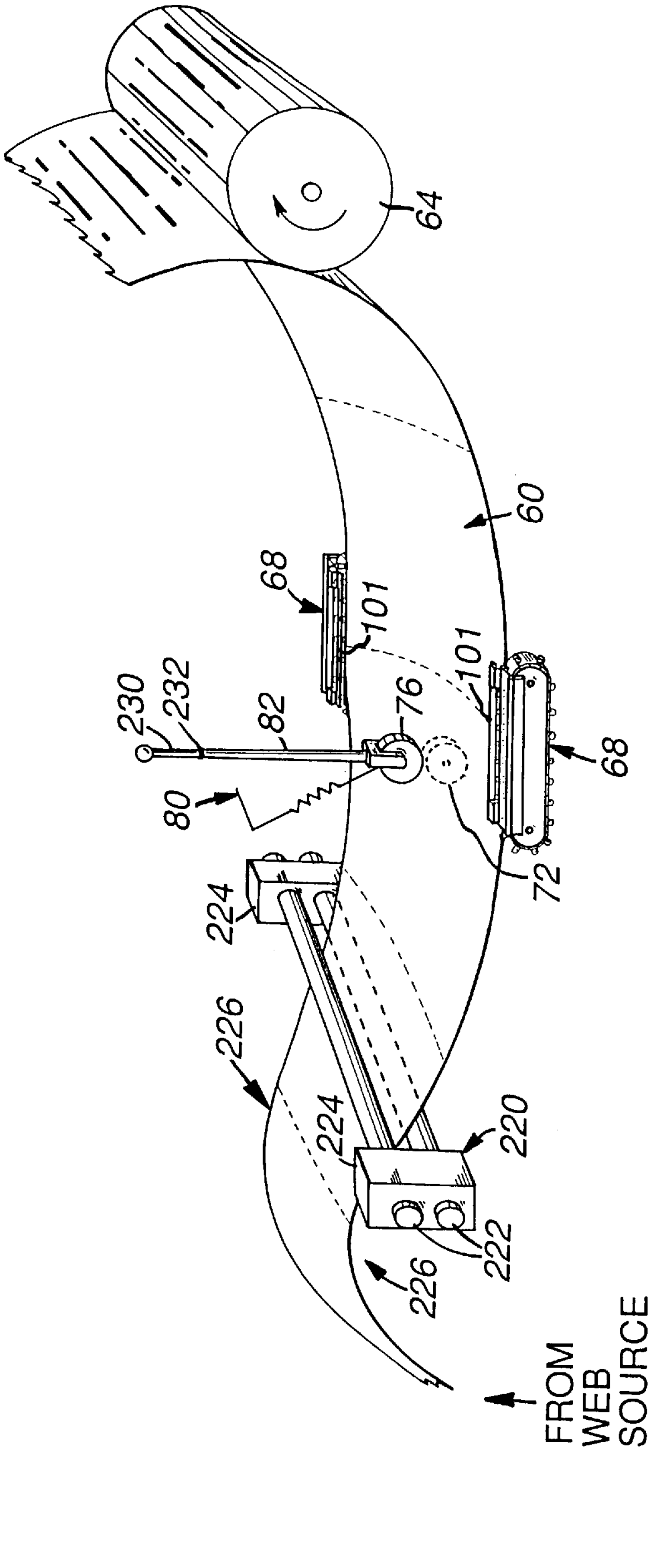
FIG. 8 is somewhat schematic perspective view of an improved guiding system according to this invention.
Figure 9:
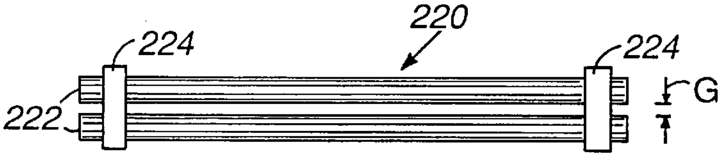
FIG. 9 is a front view of an improved guide according to FIG. 8.

A further improvement to the guiding function according to this invention, as illustrated in FIGS. 8 and 9, entails the use of a stiffener bar assembly 220 upstream of the drive roller 72 and upstream tractor pin feed drive element pair 68. The stiffener bar assembly 220 according to this embodiment can be located approximately 3–12 inches from the drive roller 72 and can be mounted on brackets (not shown) that extend from the tractor pin feed drive element 68. The stiffener bar assembly comprises a pair of round cross-section rods 222 having a diameter of approximately ½–¾ inch. The rods 222 are mounted in a spaced-apart parallel relationship on a pair of mounting blocks 224 that are located outwardly of the edges of the web 60. The blocks 224 should be mounted so that clearance is provided for the widest web contemplated. The blocks 224 can be spaced an additional inch or more beyond the edges 226 of the web 60. As detailed in FIG. 9, the blocks 224 separate the rods 222 by a gap G that, according to this embodiment, is approximately 0.015 inch. Hence, the gap G is sufficient to allow passage of most thicknesses of web therebetween, but allows little play in the web 60 as it passes through the bars 222. The bar assembly 220 thus aids in the prevention of buckling of the web 60 as it is driven to the drive roller 72.

According to this embodiment, the web 60 is threaded through the bars 222 upon loading since the bars are fixed relative to each other. It is contemplated that rod pair can be employed to facilitate loading and to accommodate different thickness of web.

Note that loading of web into the system is also facilitated by a handle 230 located upwardly of the pivot axis 232 of the follower roller bracket 82. The handle enables the user to move the follower roller 76 out of engagement with the upper side of the web 60 to facilitate loading. As discussed above, the overlying plates 101 of the tractor pin feed drive element 68 can also be lifted to allow the web to be positioned onto the tractor pin feed drive element 68.

Figure 10:
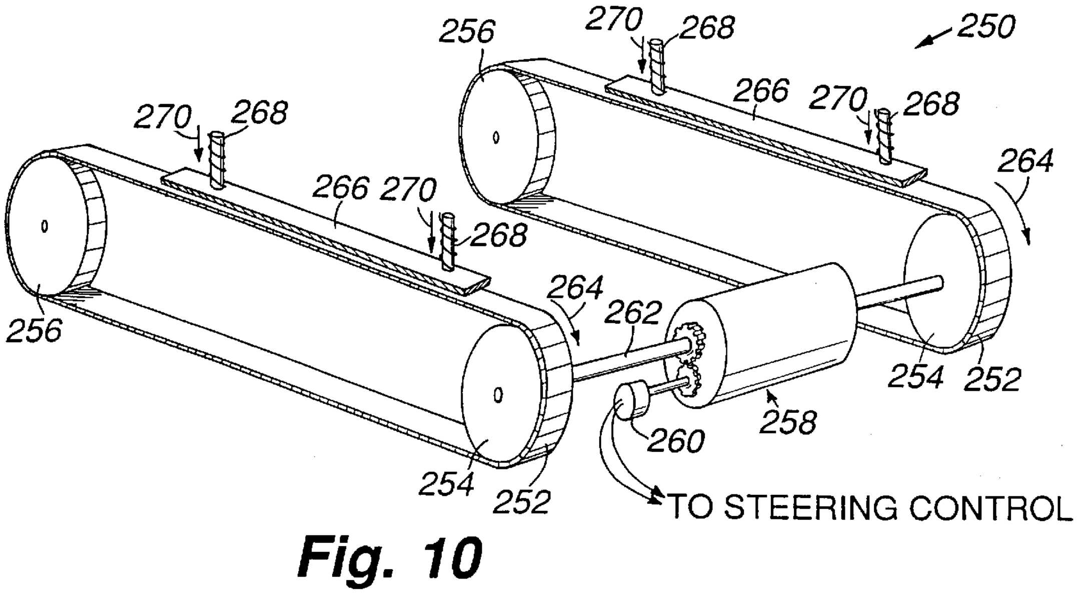
FIG. 10 is a somewhat schematic perspective view of an alternate embodiment of a web driving and guiding mechanism according to this invention.

It is further contemplated, according to this invention, that the driving and guiding functions can be combined into a single drive/guide unit. FIG. 10 illustrates a driving and guiding unit 250 that comprises a pair of elastomeric belts 252 that are, in this embodiment, fitted over the rollers 254 and 256 of the tractor feed drive elements found in a conventional utilization device. It is further contemplated that the tractor feed pin belts can be retained (not shown) and that the elastomeric belts 252 can be positioned directly over these tractor pin feed belts.

While guiding can still be provided by a separate structure, it is contemplated that, according to this embodiment, a steering differential drive assembly 258, such as the harmonic drive described above, having a differential drive motor 260, is employed in conjunction with the belt drive shaft 262. Thus, the belts are normally driven in synchronization in the direction of the arrows 264 but application of rotation by the differential drive motor 260, in a predetermined direction, causes the belts to move differentially relative to each other to effect steering of a driven web.

According to this embodiment, a respective pressure plate 266 is located over each of the belts 252. The pressure plates include springs 268 that generate a downward force (arrows 270) to maintain the web (not shown) in positive contact with the belts. The pressure plates can comprise a polished metal or similar low friction material. It is contemplated that the conventional tractor pin feed plates described above can be adapted to provide appropriate pressure against the belts 252. Alternatively, the plates can be used as mounting brackets for supplemental pressure plates such as the plates 266 described herein.

Figure 11:
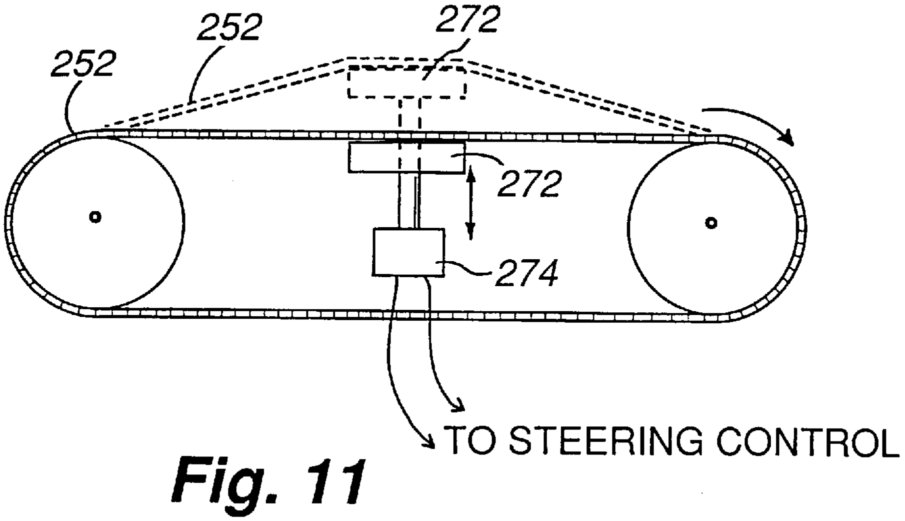
FIG. 11 is another alternative embodiment of a driving and guiding element according to this invention.

FIG. 11 illustrates an alternate steering mechanism according to this invention. An extendable pressure plate 272 shown in both retracted and extended (phantom) positions causes the belt 252 to flex (phantom). The pressure plate is controlled by a linear motor 274 that can comprise a solenoid according to this embodiment and that is interconnected with a steering controller (not shown). By stretching the belt 252, it is momentarily caused to move faster which forces the edge of the web (not shown) in contact with the belt 252 to surge forwardly further than the opposing belt (not shown) that has not stretched. In this manner, steering of the web can be effected by selective application of stretching force to each of the opposing belts.

Figure 12:
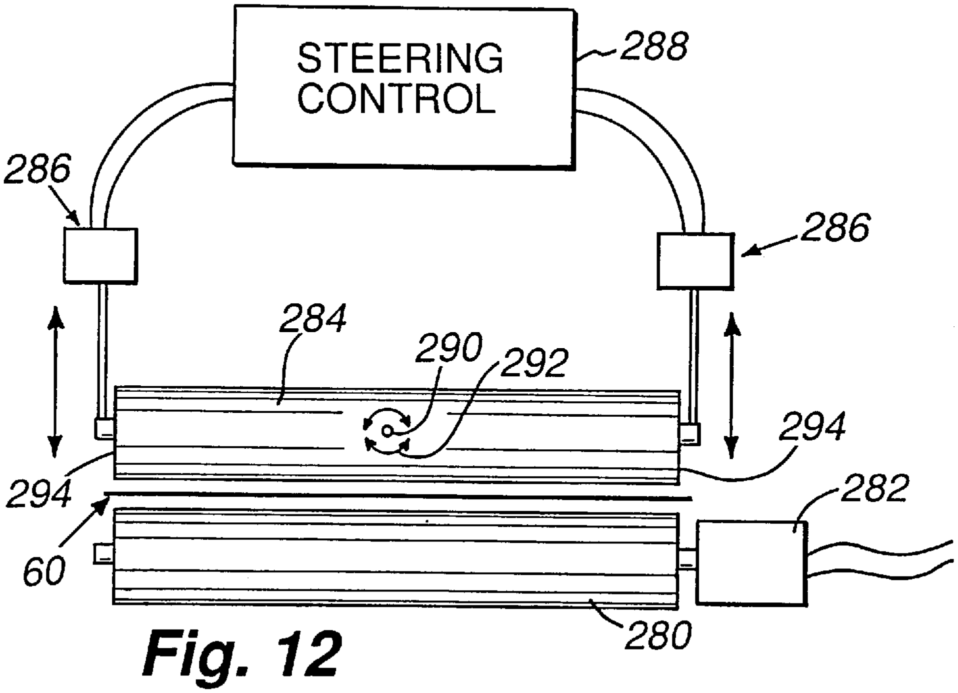
FIG. 12 is another alternate embodiment of a driving and guiding mechanism according to this invention.

FIG. 12 illustrates yet another embodiment for accomplishing the driving and guiding function according to this invention. It is contemplated that the web 60 can be driven by a full width drive roller 280 driven by a drive motor 282. Such a roller 280 can comprise an elastomeric material that changes diameter based upon application of force. A full width follower roller 284 can be located on opposing side of the web 60 from the drive roller 280. The follower roller can also comprise an elastomeric material or a harder substance such as polished metal. The drive roller 284 according to this embodiment is mounted on movable supports 286 that are interconnected with a steering controller 288. The supports 286 enable the follower roller 280 to pivot approximately about the axis 290 (curved arrow 292) so that opposing ends 294 of the roller 284 can be brought into more-forcible contact with the drive roller 280. Hence, the diameter of the drive roller 280 at a given end can be altered and the drag force generated between the drive roller 280 and follower roller 284 can be increased at a given end. The increase in drag and/or decrease in diameter cause the web to change direction as it passes through the drive and follower rollers 280 and 284, respectively. Thus, a full length roller can be utilized to positively steer the web 60 relative to the utilization device element.

In each of the foregoing embodiments, it is contemplated that the steering controller directs steering of the web 60 to align the web relative to the utilization device element. Such alignment ensures that the utilization device element performs its operation (such as printing) on the web at the desired location relative to the web's width-wise edges. As illustrated above, it should be clear that driving and guiding can be accomplished, according to this invention, at a single point along the web, along the entire width of the web, or at the edges of the web. The driving and guiding components described herein can be provided as an integral unit or can be divided into separate units that are located approximately adjacent, or remote from each other along the web's path of travel.

It is contemplated that the pinless web feed system according to this invention can be used selectively so that standard tractor pin feed web can still be utilized when desired. Hence, all components of the pinless feed system can be located out of interfering engagement with the tractor pin feed drive elements and all sensors used by the pinless feed system can be deactivated or switched back to a standard tractor pin feed drive mode. For example, a hole sensor can be retained and selectively connected to the utilization device's main controller to effect registration when desired. Additionally, as discussed above, the follower roller 76 can be moved out of interfering engagement with the upper side of the web 60 to enable the tractor pin feed drive elements 68 and 70 to effect drive of the web 60.

The foregoing has been a detailed description of a preferred embodiment. Various modifications and equivalents can be made without departing from the spirit and scope of this invention. For example, a variety of utilization devices that are normally adapted to feed continuous web using a tractor pin feed drive mechanism can employ the guiding, driving and registration concepts described herein. Such utilization devices can employ a variety of "utilization device elements" such as print heads, embossers, cutters, sealers, folders, inverters, and separators.

Additionally, continuous web can be provided with or without perforations and a downstream cutter can be utilized to separate the printed web into sheets. Further downstream drives, edge guides and registration devices can also be employed to direct the web to further utilization devices. Such utilization devices can be enclosed within the housing of a main printer or can be separate components between which the web passes. This description is, therefore, meant to be taken only by way of example and not to otherwise limit the scope of the invention.

What is claimed is:

1. A printing device adapted to feed either of a pin feed continuous web having tractor pin feed holes and a pinless continuous web devoid of pin holes and having marks disposed in an upstream-to-downstream direction therealong at predetermined length intervals, the printing device comprising:

- a lower tractor feed unit, wherein the lower tractor feed unit includes opposing moving tractor pin feed strips each having sets of pins that engage respective opposing side edges of the pinless continuous web so that the pinless continuous web is guided as it moves in a downstream direction;
- a high volume image transfer drum, located downstream of the lower tractor feed unit that rotates at a drum speed and that thereby transfers an image onto either of the pin feed continuous web and the pinless continuous web;
- a fuser located downstream of the image transfer drum;
- a drive roller that engages the pinless continuous web at a location upstream of the image transfer drum and that drives the pinless continuous web toward the image transfer drum;
- a central drive motor that drives the lower tractor pin feed unit at a speed that matches the drum speed of the image transfer drum;
- a differential having a drive motor input and a differential input, the differential being operatively interconnected with the drive roller and the differential being constructed and arranged so that the drive roller rotates in conjunction with the central drive motor at a roller rotational speed, wherein the roller rotational speed is varied based upon input movement at the differential input;
- a mark sensor located at a predetermined distance from the image transfer drum that reads occurrences of the marks on the pinless continuous web as the pinless continuous web passes therethrough and that generates a mark sensor signal in response to a sensed occurrence of each of the marks;
- a signal generator responsive to movement of the pinless continuous web constructed and arranged to provide a movement signal that indicates an amount of movement of the pinless continuous web;
- a registration controller that receives the mark signal and the movement signal, the registration controller being constructed and arranged to compare the mark sensor signal to the movement signal and thereby generate a control signal; and
- a registration controller motor interconnected with and controlled by the registration controller, the registration controller motor being operatively interconnected to the differential input to drive the differential to thereby vary the roller rotational speed of the drive roller in response to the control signal.

2. The printing device as set forth in claim 1 wherein the drive roller comprises a metal roller and further comprising an idler roller located on a side of the pinless continuous web opposite a side of the pinless continuous web that engages the drive roller, the idler roller being constructed and arranged to pressurably engage the drive roller.

3. The printing device as set forth in claim 2 wherein the pressure roller includes a spring that biases the pressure roller toward the drive roller and a mounting structure constructed and arranged so that the pressure roller can be selectively moved into and out of engagement with the drive roller, whereby the drive roller is, in turn, selectively engages the web located thereat.

4. The printing device as set forth in claim 1, wherein the differential comprises a harmonic drive interconnected between the drive roller and the registration controller motor.

5. The printing device as set forth in claim 1 further comprising at least one pair of bars being approximately parallel to each other and being located upstream of the drive roller, wherein the web passes between the bars.

6. The printing device as set forth in claim 1 further comprising an upper tractor pin feed unit, downstream of the image transfer drum through which the continuous pinless web passes, wherein the upper tractor feed unit includes opposing moving tractor pin feed strips each having sets of pins that engage respective opposing side edges of the pinless continuous web so that the pinless continuous web is guided as it moves in a downstream direction.

7. The printing device as set forth in claim 1 wherein the marks comprise preprinted marks and wherein the mark sensor comprises an optical sensor that scans for each of the marks.

8. The printing device as set forth in claim 7 wherein the registration controller is constructed and arranged to compare each received mark signal to the movement signals to, thereby, direct either of an advance and a retard command to the registration controller motor when the respective number of predetermined increments of movement is less that or greater than a desired number of predetermined increments of movement, respectively.

9. The printing device as set forth in claim 1 wherein the opposing side edges of the pinless continuous web define therebetween a plane and wherein a surface of the drive roller at a location in engagement with the pinless continuous web is located remote from the plane whereby the drive roller causes the pinless continuous web to assume a trough shape for added stiffness thereof.

10. The printing device as set forth in claim 9 further comprising movable covers constructed and arranged to respectively overlie each of the pin feed strips at selected times that respectively maintain the opposing side edges of the pinless continuous web in engagement with the pin feed strips.

11. The printing device as set forth in claim 1 herein the drive roller is positioned on a shaft between each of the opposing tractor pin feed strips and wherein the drive roller has a width, in a direction transverse to the upstream-to downstream direction less than a spacing between the tractor pin feed strips so that opposing widthwise edges of the drive roller are remote from the tractor pin feed strips.

12. In a printing device adapted to feed either of a pin feed continuous web having tractor pin feed holes and a pinless continuous web devoid of pin holes and having marks disposed in an upstream-to-downstream direction therealong at predetermined length intervals, the printing device having a lower tractor feed unit, wherein the lower tractor feed unit includes opposing moving tractor pin feed strips each having sets of pins that engage respective opposing side edges of the pinless continuous web so that the pinless continuous web is guided as it moves in a downstream direction; a high volume image transfer drum, located downstream of the lower tractor feed unit that rotates at a drum speed and that thereby transfers an image onto either of the pin feed continuous web and the pinless continuous web; a fuser located downstream of the image transfer drum, a pinless continuous web drive system comprising:

a drive roller that engages the pinless continuous web at a location upstream of the image transfer drum and that drives the pinless continuous web toward the image transfer drum;

a central drive motor that drives the lower tractor pin feed unit at a speed that matches the drum speed of the image transfer drum;

a differential having a drive motor input and a differential input, the differential being operatively interconnected with the drive roller and the differential being constructed and arranged so that the drive roller rotates in conjunction with the central drive motor at a roller rotational speed, wherein the roller rotational speed is varied based upon input movement at the differential input;

a mark sensor located at a predetermined distance from the image transfer drum that reads occurrences of the marks on the pinless continuous web as the pinless continuous web passes therethrough and that generates a mark sensor signal in response to a sensed occurrence of each of the marks;

a signal generator responsive to movement of the pinless continuous web constructed and arranged to provide a movement signal that indicates an amount of movement of the pinless continuous web;

a registration controller that receives the mark signal and the movement signal, the registration controller being constructed and arranged to compare the mark sensor signal to the movement signal and thereby generate a control signal; and a registration controller motor interconnected with and controlled by the registration controller, the registration controller motor being operatively interconnected to the differential input to drive the differential to thereby vary the roller rotational speed of the drive roller in response to the control signal.

* * * * *